(12) United States Patent
Ishihata et al.

(10) Patent No.: US 8,950,731 B2
(45) Date of Patent: Feb. 10, 2015

(54) EXHAUST VALVE STRUCTURE

(75) Inventors: Takato Ishihata, Takahama (JP); Shuichi Kizawa, Toyota (JP); Minato Tomuro, Aichi-ken (JP); Yoshihiko Suzuki, Aichi-ken (JP); Arata Kobayashi, Aichi-ken (JP); Masafumi Wada, Aichi-ken (JP); Shigeru Fukuoka, Okazaki (JP); Shigeomi Hamakawa, Okazaki (JP)

(73) Assignees: Toyota Jidosha Kabushiki Kaisha, Toyota-shi (JP); Futaba Industrial Co., Ltd, Okazaki (JP)

( * ) Notice: Subject to any disclaimer, the term of this patent is extended or adjusted under 35 U.S.C. 154(b) by 894 days.

(21) Appl. No.: 13/041,671

(22) Filed: Mar. 7, 2011

(65) Prior Publication Data

US 2011/0215272 A1 Sep. 8, 2011

(30) Foreign Application Priority Data

Mar. 5, 2010 (JP) ................................ 2010-049152

(51) Int. Cl.
*F16K 1/16* (2006.01)
*F16K 1/42* (2006.01)

(52) U.S. Cl.
CPC ........................................ *F16K 1/42* (2013.01)
USPC ............................ 251/301; 251/333; 251/359

(58) Field of Classification Search
USPC ......... 251/301, 303, 299, 300, 298, 359, 360, 251/333
See application file for complete search history.

(56) References Cited

U.S. PATENT DOCUMENTS

| 3,185,489 A * | 5/1965 | Klinger-Lohr ................ 277/399 |
| 3,315,585 A * | 4/1967 | Hawkins et al. .............. 454/292 |
| 4,121,607 A * | 10/1978 | Bader ........................ 137/454.5 |
| 4,962,911 A * | 10/1990 | Soderberg ..................... 251/159 |
| 5,323,859 A * | 6/1994 | Smith et al. .................... 166/321 |
| 5,462,291 A * | 10/1995 | Maeda et al. ................. 277/507 |
| 7,717,435 B2 * | 5/2010 | Kubota et al. ................. 277/650 |
| 7,883,095 B2 * | 2/2011 | Miyamoto et al. ............. 277/627 |
| 8,186,721 B2 * | 5/2012 | Furukido et al. .............. 285/267 |
| 8,240,040 B2 * | 8/2012 | Miyamoto et al. ........... 29/888.3 |

FOREIGN PATENT DOCUMENTS

| JP | H09-195749 A | 7/1997 |
| JP | 2002-106323 A | 4/2002 |
| JP | 2008101479 A | 5/2008 |
| JP | 2008121452 A | 5/2008 |
| JP | 2009-024565 A | 2/2009 |
| JP | 2010-031669 A | 2/2010 |

OTHER PUBLICATIONS

Japanese Office Action issued Dec. 13, 2011 from JP 2010-049152 with partial English translation.

* cited by examiner

*Primary Examiner* — John K Fristoe, Jr.
*Assistant Examiner* — Andrew J Rost
(74) *Attorney, Agent, or Firm* — Gifford, Krass, Sprinkle, Anderson & Citkowski, P.C.

(57) ABSTRACT

An exhaust valve structure includes: an inner cylindrical portion that forms an introducing passage of exhaust gas and that has a stay member; a valve element that closes or opens the introducing passage; and a wire mesh that is fixed to the stay member and that contacts the valve element when the introducing passage is closed. The wire mesh is formed in a shape such that a diameter of the wire mesh gradually increases toward a downstream side of the introducing passage and a load exerted on the stay member when the valve element contacts the wire mesh is distributed in a diameter-increasing direction in which the diameter of the wire mesh increases.

14 Claims, 10 Drawing Sheets

EXHAUST VALVE STRUCTURE

CROSS-REFERENCE TO RELATED APPLICATIONS

This application claims priority to Japanese Patent Application No. 2010-049152 filed on Mar. 5, 2010, which is incorporated herein by reference in its entirety including the specification, drawings and abstract.

BACKGROUND OF THE INVENTION

1. Field of the Invention

The invention relates to an exhaust valve structure provided in an exhaust passage of an internal combustion engine equipped for a vehicle.

2. Description of the Related Art

In general, an exhaust valve structure of this type is provided in an exhaust passage of an internal combustion engine for the purpose of changing the flow passage of exhaust gas, controlling the flow rate of exhaust gas, or the like.

In an existing art, such an exhaust valve structure is applied to an exhaust heat recovery system that recovers the heat of exhaust gas emitted from an engine serving as an internal combustion engine through heat exchange with engine coolant to utilize the heat for heating, facilitating the warm-up of the engine, or the like (for example, see Japanese Patent Application Publication No. 2008-101479 (JP-A-2008-101479)).

The exhaust heat recovery system described in JP-A-2008-101479 is provided in a bypass passage for bypassing an exhaust system heat exchanger. The exhaust heat recovery system opens or closes the bypass passage in accordance with the pressure of exhaust gas to thereby switch between an exhaust heat recovery mode in which exhaust gas exchanges heat with the engine and a normal mode in which exhaust gas passes through the bypass passage.

The exhaust valve structure that constitutes the exhaust heat recovery system includes a substantially rectangular box-shaped valve housing and a valve. The valve housing is connected to an inner pipe having a bypass passage inside, and the internal space of the valve housing serves as a downstream end of the bypass passage. The valve is pivotably attached to the valve housing via a pivot shaft. The valve housing has a pair of main exhaust ports at respective side walls arranged along a direction in which exhaust gas flows. The pair of main exhaust ports are opposite to each other in a direction perpendicular to the direction in which exhaust gas flows. The valve housing has a sub-exhaust port at the lower portion of an end plate that closes the downstream end in the direction in which exhaust gas flows. The sub-exhaust port has an area smaller than the sectional area of an exhaust gas passage. In addition, the valve includes a main valve portion for opening or closing the pair of main exhaust ports and a sub-valve portion for opening or closing the sub-exhaust port.

In the thus configured exhaust valve structure described in JP-A-2008-101479, a return spring is anchored to one end of the pivot shaft of the valve, and the valve is placed in a closed position in which the main valve portions and the sub-valve portion respectively close the main exhaust valve ports and the sub-exhaust valve port by the urging force of the return spring. On the other hand, when the pressure of exhaust gas exerted on the valve is higher than or equal to a predetermined value, the valve pivots against the urging force of the return spring to shift from the closed position to an open position in which the main exhaust ports and the sub-exhaust port are open.

Then, in the exhaust valve structure, exhaust pulse that propagates through the bypass passage is uniformly exerted on the pair of main valve portions, so the force based on the exhaust pulse exerted on one of the main valve portions becomes the reaction force against the force based on the exhaust pulse exerted on the other one of the main valve portions. Therefore, the forces for displacing the valve with respect to the valve housing owing to exhaust pulse are cancelled. As a result, in the exhaust valve structure, chattering of the valve due to exhaust pulse exerted on the pair of main valve portions is suppressed.

In addition, in the above described exhaust valve structure, the pressure receiving area of the sub-valve portion on which exhaust pulse is exerted together with the main valve portions is small because of the small-area sub-exhaust port, so the sub-valve portion may be formed to be insensitive to exhaust pulse. Therefore, chattering of the valve due to exhaust pulse exerted on the sub-valve portion is suppressed.

In addition, in the exhaust valve structure described in JP-A-2008-101479, a wire mesh is interposed between the peripheral portion of each main exhaust port of the valve housing and a corresponding one of the main valve portions of the valve to serve as a seal to thereby prevent leakage of exhaust gas.

However, in the above described existing exhaust valve structure described in JP-A-2008-101479, chattering of the valve is suppressed to suppress noise due to the chattering; however, chattering is not reliably prevented, and there is a problem that it is impossible to suppress noise when chattering occurs.

In addition, in the existing exhaust valve structure, the wire mesh is interposed between the valve housing and the valve; however, the wire mesh is provided so as to serve as a seal, and the wire mesh is not intended to absorb an impact during chattering to suppress an impact sound.

Therefore, if the wire mesh is just interposed between the valve housing and the valve as in the case of the existing art, an impact during chattering cannot be absorbed, and, as a result, there is a problem that it is insufficient to prevent noise resulting from chattering.

SUMMARY OF INVENTION

The invention provides an exhaust valve structure that is able to prevent an impact sound made through an impact during chattering.

An aspect of the invention provides an exhaust valve structure. The exhaust valve structure includes: a cylindrical member that is configured to form a passage of exhaust gas and to have a valve seat portion; a valve element that is configured to close or open the passage; and a wire mesh that is configured to be fixed to the valve seat portion and to contact the valve element when the passage is closed, wherein the wire mesh is formed in a shape such that a diameter of the wire mesh gradually increases toward a downstream side of the passage and a load exerted on the valve seat portion when the valve element contacts the wire mesh is distributed in a diameter-increasing direction in which the diameter of the wire mesh increases.

With the above exhaust valve structure, the wire mesh is formed in a shape such that a diameter of the wire mesh gradually increases toward a downstream side of the passage and a load exerted on the valve seat portion when the valve element contacts the wire mesh is distributed in a diameter-increasing direction in which the diameter of the wire mesh increases, so it is possible to reduce a load exerted on the valve seat portion when the valve element contacts the wire mesh as compared with the existing art. Therefore, the exhaust valve structure is able to prevent generation of an impact sound due to an impact during chattering.

In addition, in the exhaust valve structure, the valve element may have an outer peripheral surface portion that contacts the wire mesh when the passage is closed, the wire mesh may be formed of a cylindrical fixing portion that is fixed to the valve seat portion and a contact portion that is integrally formed with the fixing portion and that contacts the valve element to receive a load from the valve element when the passage is closed, the valve seat portion may have a cylindrical mesh support portion to which the fixing portion is fixed and a bent portion that is bent radially outward with respect to the mesh support portion and that retains the contact portion, the contact portion may have an inner peripheral surface portion that contacts the outer peripheral surface portion when the passage is closed and a deformable surface portion that is formed at an end in the diameter-increasing direction, and the inner peripheral surface portion may be inclined radially inward with respect to the bent portion.

With the above exhaust valve structure, the inner peripheral surface portion is inclined radially inward with respect to the bent portion of the valve seat portion, so a load received from the valve element when the inner peripheral surface portion contacts the outer peripheral surface portion of the valve element may be exerted on the deformable surface portion. Therefore, when the outer peripheral surface portion of the valve element contacts the inner peripheral surface portion of the contact portion, the exhaust valve structure is able to elastically deform the deformable surface portion by a load received from the valve element.

Thus, it is possible to absorb an impact during chattering owing to the elastic deformation of the deformable surface portion. As a result, the exhaust valve structure is able to prevent generation of an impact sound due to an impact during chattering.

In addition, in the exhaust valve structure, the contact portion may have a retained surface portion that is retained by the bent portion, and the deformable surface portion may have a top edge portion that is spaced apart in the diameter-increasing direction from a plane that includes a peripheral edge of the inner peripheral surface portion in the diameter-increasing direction and an outer edge of the retained surface portion in the diameter-increasing direction.

With the above exhaust valve structure, the deformable surface portion has a top edge portion that is spaced apart in the diameter-increasing direction from a plane that includes a peripheral edge of the inner peripheral surface portion in the diameter-increasing direction and an outer edge of the retained surface portion in the diameter-increasing direction, so, when the outer peripheral surface portion of the valve element contacts the inner peripheral surface portion of the wire mesh, the deformable surface portion may be easily elastically deformed in the diameter-increasing direction by a load received from the valve element.

Therefore, the exhaust valve structure is able to absorb an impact during chattering owing to the elastic deformation of the deformable surface portion, and is able to prevent generation of an impact sound.

In addition, in the exhaust valve structure, the deformable surface portion may have a cutout surface portion that is cut at a predetermined angle with respect to the retained surface portion, and the deformable surface portion may deform so that the cutout surface portion collapses on a side of the valve seat portion by a load received from the valve element when the valve element contacts the inner peripheral surface portion.

With the above exhaust valve structure, the deformable surface portion has a cutout surface portion that is cut at a predetermined angle with respect to the retained surface portion. In addition, the deformable surface portion deforms to cause the cutout surface portion to collapse on a side of the valve seat portion by a load received from the valve element when the valve element contacts the inner peripheral surface portion.

Therefore, the exhaust valve structure is able to absorb an impact during chattering owing to the collapse of the cutout surface portion, and is able to prevent generation of an impact sound.

In addition, in the exhaust valve structure, a radially sectional shape of the deformable surface portion may be a circular arc shape. In addition, a radially sectional shape of the inner peripheral surface portion may be a circular arc shape.

In addition, in the exhaust valve structure, the contact portion may be thicker than the fixing portion.

With the above exhaust valve structure, the contact portion is thicker than the fixing portion, so it is possible to improve the impact absorption performance of the contact portion.

In addition, only the contact portion is made thick, and the thickness of the fixing portion may be formed as large as the thickness of the fixing portion in the existing art, so there is no influence even when the wire mesh is fixed to the valve seat portion by, for example, spot welding. Therefore, the exhaust valve structure is able to ensure production technique and assembling work as in the existing art.

Another aspect of the invention provides an exhaust valve structure. The exhaust valve structure includes: a cylindrical member that is configured to form a passage of exhaust gas and to have a valve seat portion; a valve element that is configured to close or open the passage; and a wire mesh that is configured to be fixed to the valve seat portion and to contact the valve element when the passage is closed, wherein the valve element has an outer peripheral surface portion that contacts the wire mesh when the passage is closed, the wire mesh is formed in a shape such that a diameter of the wire mesh gradually increases toward a downstream side of the passage, the wire mesh is formed of a cylindrical fixing portion that is fixed to the valve seat portion and a contact portion that is integrally formed with the fixing portion and that contacts the valve to receive a load from the valve element when the passage is closed, the valve seat portion has a cylindrical mesh support portion to which the fixing portion is fixed and a bent portion that is bent radially outward with respect to the mesh support portion and that retains the contact portion, the contact portion has an inner peripheral surface portion that contacts the outer peripheral surface portion when the passage is closed and a deformable surface portion that is formed at an end in a diameter-increasing direction in which the diameter of the wire mesh increases, and the inner peripheral surface portion is inclined radially inward with respect to the bent portion.

With the above exhaust valve structure, the inner peripheral surface portion is inclined radially inward with respect to the bent portion of the valve seat portion, so a load received from the valve element when the inner peripheral surface portion contacts the outer peripheral surface portion of the valve element may be exerted on the deformable surface portion. Therefore, when the outer peripheral surface portion of the valve element contacts the inner peripheral surface portion of the contact portion, the exhaust valve structure is able to elastically deform the deformable surface portion by a load received from the valve element.

Thus, it is possible to absorb an impact during chattering owing to the elastic deformation of the deformable surface portion. As a result, the exhaust valve structure is able to prevent generation of an impact sound due to an impact during chattering.

According to the aspects of the invention, it is possible to provide an exhaust valve structure that is able to prevent generation of an impact sound due to an impact during chattering.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

First, a vehicle exhaust system structure including an exhaust valve device to which an exhaust valve structure according to the embodiment of the invention is applied will be described. Note that, in the following description, when the words upstream and downstream are simply used, the words respectively mean the upstream and downstream of a direction in which exhaust gas flows.

Figure 1:
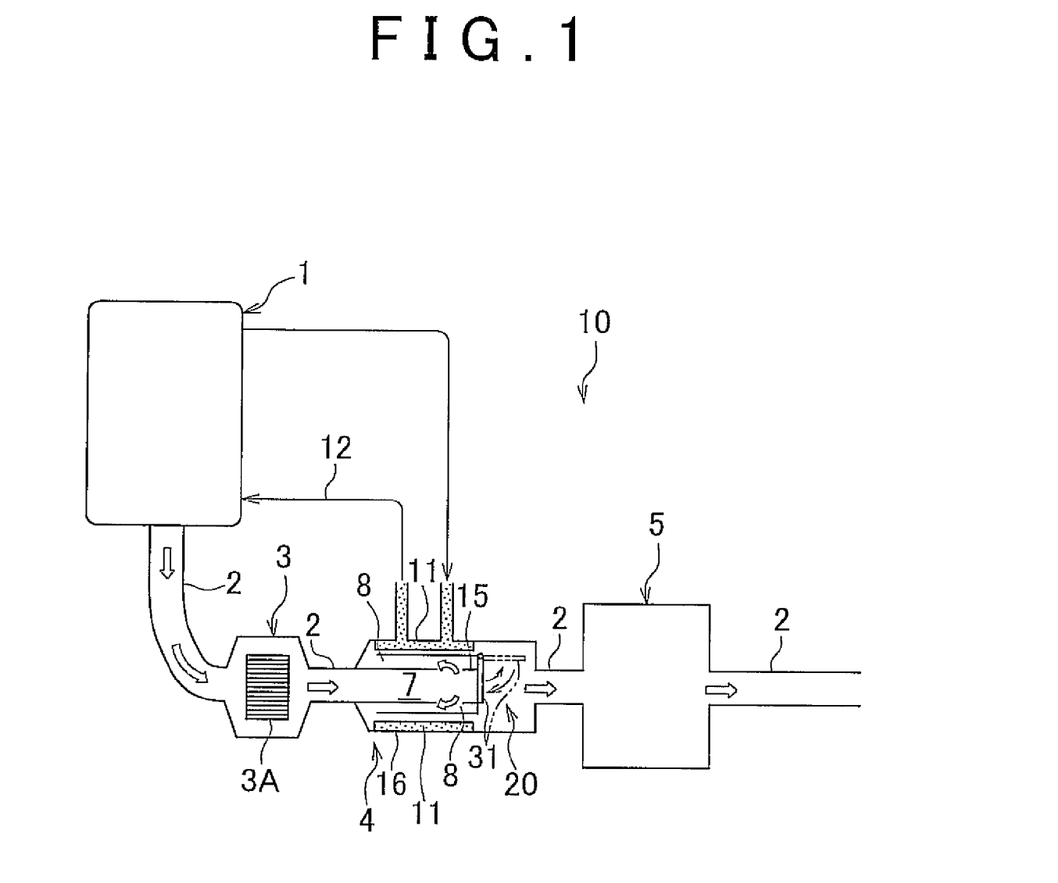
FIG. 1 is a schematic configuration diagram that schematically shows a vehicle exhaust system structure including an exhaust valve device to which an exhaust valve structure according to an embodiment of the invention is applied.

As shown in FIG. 1, the vehicle exhaust system structure 10 includes an exhaust pipe 2, a catalyst converter 3, an exhaust heat recovery device 4 that serves as a heat exchanger, and a main muffler 5 that serves as a muffler.

The exhaust pipe 2 is connected to an engine 1 that serves as an internal combustion engine equipped for a vehicle. The exhaust pipe 2 has an exhaust passage inside for delivering exhaust gas emitted from the engine 1. In addition, the above described catalyst converter 3, exhaust heat recovery device 4 and main muffler 5 are arranged in the exhaust passage formed in the exhaust pipe 2 in order from the upstream side.

The catalyst converter 3 purifies exhaust gas passing therethrough by an internal catalyst 3A.

The exhaust heat recovery device 4 recovers the heat of exhaust gas emitted from the engine 1 by heat exchange with engine coolant, and then utilizes the heat for heating, facilitating the warm-up of the engine 1, or the like.

In addition, the exhaust heat recovery device 4 has an introducing passage 7, an exhaust gas passage 8 and a coolant passage 11 inside.

The introducing passage 7 is a passage through which exhaust gas from the upstream side is introduced. The introducing passage 7 also functions as a passage for emitting a major part of introduced exhaust gas to the downstream side when the exhaust gas does not exchange heat with engine coolant.

The exhaust gas passage 8 is a passage through which exhaust gas flows when the exhaust gas exchanges heat with engine coolant. The coolant passage 11 is a passage through which engine coolant serving as refrigerant that exchanges heat with exhaust gas flows in the exhaust heat recovery device 4.

In addition, an exhaust valve device 20 that serves as a passage switching valve is provided at the downstream end of the introducing passage 7. The exhaust valve device 20 opens or closes the introducing passage 7 to switch to any one of a passage through which introduced exhaust gas is emitted directly to the downstream side via the introducing passage 7 and a passage through which introduced exhaust gas is emitted to the downstream side via the exhaust gas passage 8. By so doing, the vehicle exhaust system structure 10 is able to switch between an exhaust heat recovery mode and a normal mode. In the exhaust heat recovery made, exhaust gas passes through the exhaust gas passage 8 to exchange heat with engine coolant. In the normal mode, exhaust gas directly passes through the introducing passage 7 without passing through the exhaust gas passage 8.

Furthermore, in the vehicle exhaust system structure 10, a coolant circulation passage 12 is in fluid communication with the coolant passage 11 of the exhaust heat recovery device 4. The coolant circulation passage 12 is used to circulate engine coolant that flows through the coolant passage 11. In the present embodiment, the coolant circulation passage 12 provides fluid communication between the engine 1 and the exhaust heat recovery device 4 in series. In addition, although not shown in the drawing, a heater core that serves as a heater heat source is arranged in the coolant circulation passage 12.

The main muffler 5 is configured to reduce (muffle) exhaust noise that is generated as purified exhaust gas is emitted into the atmosphere.

Figure 2:
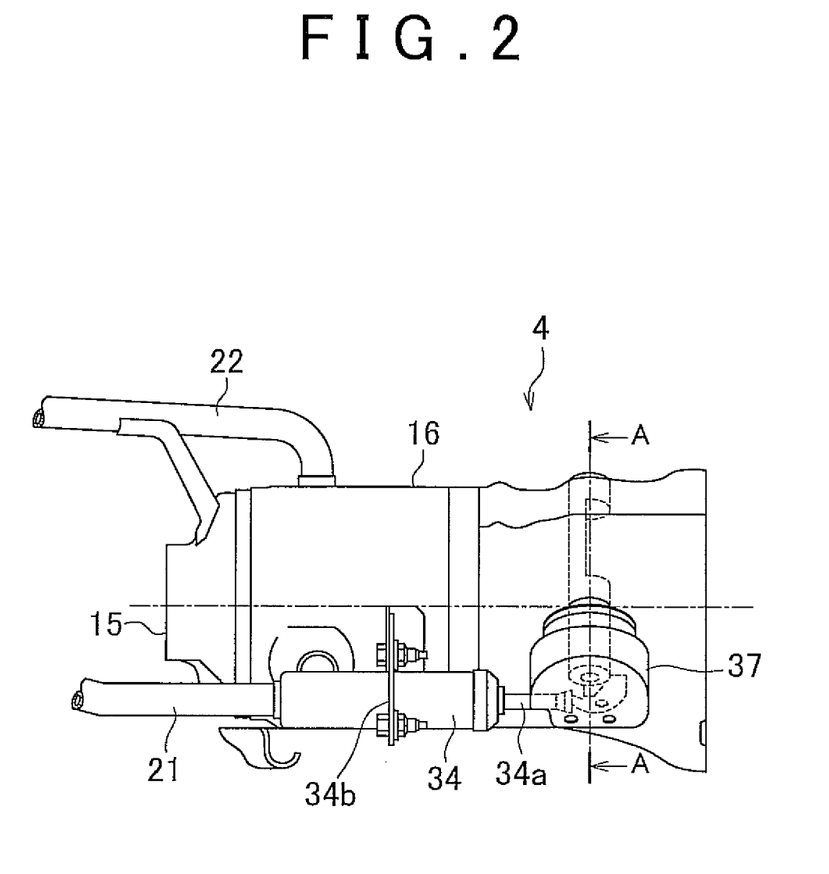
FIG. 2 is a front view that shows an exhaust heat recovery device according to the embodiment of the invention.
Figure 3:
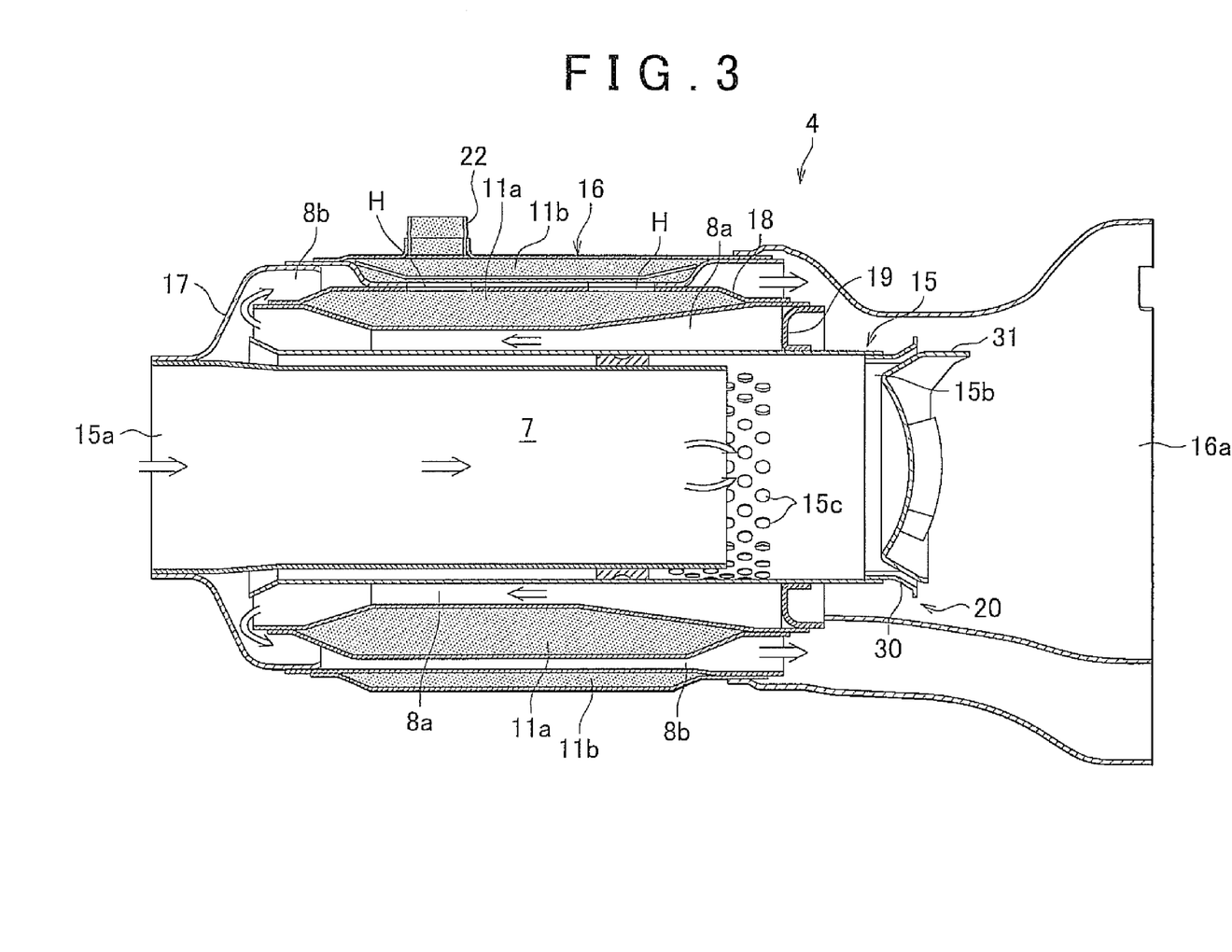
FIG. 3 is a side sectional view of the exhaust heat recovery device according to the embodiment of the invention.

Next, the exhaust heat recovery device 4 will be described in detail with reference to FIG. 2 to FIG. 4. As shown in FIG. 2 and FIG. 3, the exhaust heat recovery device 4 includes an inner cylindrical portion 15, an outer cylindrical portion 16 and the exhaust valve device 20. The inner cylindrical portion 15 and the outer cylindrical portion 16 constitute a so-called exhaust pipe.

The inner cylindrical portion 15 has an exhaust gas introducing port 15a at an end portion at the upstream side (upstream end) thereof. Exhaust gas is introduced from the upstream side into the exhaust gas introducing port 15*a*. An upstream side component is connected to the upstream end of the inner cylindrical portion 15. On the other hand, the inner cylindrical portion 15 has an opening portion 15*b* at an end portion at the downstream side (downstream end) thereof. A stay member 30 (described later) is connected to the downstream end of the inner cylindrical portion 15.

In addition, a large number of communication holes 15*c* are formed through the outer peripheral side surface of the inner cylindrical portion 15. The communication holes 15*c* provide fluid communication between the inner and outer spaces of the inner cylindrical portion 15. Furthermore, the inner cylindrical portion 15 has the above described introducing passage 7 inside.

Heat recovery exhaust gas passages 8*a* and 8*b* and engine coolant passages 11*a* and 11*b* are fanned between the inner cylindrical portion 15 and the outer cylindrical portion 16. These heat recovery exhaust gas passages 8*a* and 8*b* and engine coolant passages 11*a* and 11*b* are arranged radially outward from the outer peripheral side of the inner cylindrical portion 15 in order of the heat recovery exhaust gas passage 8*a*, the engine coolant passage 11*a*, the heat recovery exhaust gas passage 8*b* and the engine coolant passage 11*b*. Note that the heat recovery exhaust gas passages 8*a* and 8*b* constitute the exhaust gas passage 8 shown in FIG. 1, and the engine coolant passages 11*a* and 11*b* constitute the coolant passage 11 shown in FIG. 1.

The inner engine coolant passage 11*a* and the outer engine coolant passage 11*b* are in fluid communication with each other at multiple communication portions H, and engine coolant is allowed to flow between the inner engine coolant passage 11*a* and the outer engine coolant passage 11*b* via the communication portions H.

The outer cylindrical portion 16 constitutes an outer peripheral wall that forms the engine coolant passage 11*b*, and extends further from the portion, at which the exhaust valve device 20 is arranged in the exhaust passage, toward the downstream side. The outer cylindrical portion 16 has an exhaust port 16*a* at the downstream end thereof. The exhaust port 16*a* emits exhaust gas that has passed through the outer cylindrical portion 16. In addition, the downstream end of the outer cylindrical portion 16 is connected to the downstream side of the exhaust pipe 2 (see FIG. 1).

The space between the outer peripheral surface of the inner cylindrical portion 15 and the upstream end of the outer cylindrical portion 16 is closed by a closing member 17, and introduced exhaust gas is guided to a desired passage. In addition, the space between the outer peripheral surface of the inner cylindrical portion 15 and the downstream end of a coolant passage member 18 that forms the engine coolant passage 11*a* is closed by a closing member 19, and introduced exhaust gas is guided to a desired passage.

A coolant introducing hose 21 is connected to near the bottom of the outer cylindrical portion 16. A coolant introducing passage formed inside the coolant introducing hose 21 is in fluid communication with the engine coolant passages 11*a* and 11*b*. Engine coolant is introduced into the engine coolant passages 11*a* and 11*b* via the coolant introducing hose 21.

In addition, a coolant drain hose 22 is connected to the top of the outer cylindrical portion 16, and a coolant drain passage formed inside the coolant drain hose 22 is in fluid communication with the outer engine coolant passage 11*b*. Heated engine coolant is delivered to the outside of the exhaust heat recovery device 4 via the coolant drain hose 22.

As shown in FIG. 2 to FIG. 5, the exhaust valve device 20 includes the stay member 30, a valve element 31, a pivot shaft 32, a helical torsion spring 33 and a cylinder type actuator 34 (see FIG. 2).

The stay member 30 is formed of a cylindrical member of which one end is connected to the downstream end of the inner cylindrical portion 15 and which increases in diameter radially outward toward the other end thereof. A wire mesh 60 (described later) is fixed to the stay member 30 by a fixing method, such as spot welding.

Figure 5:
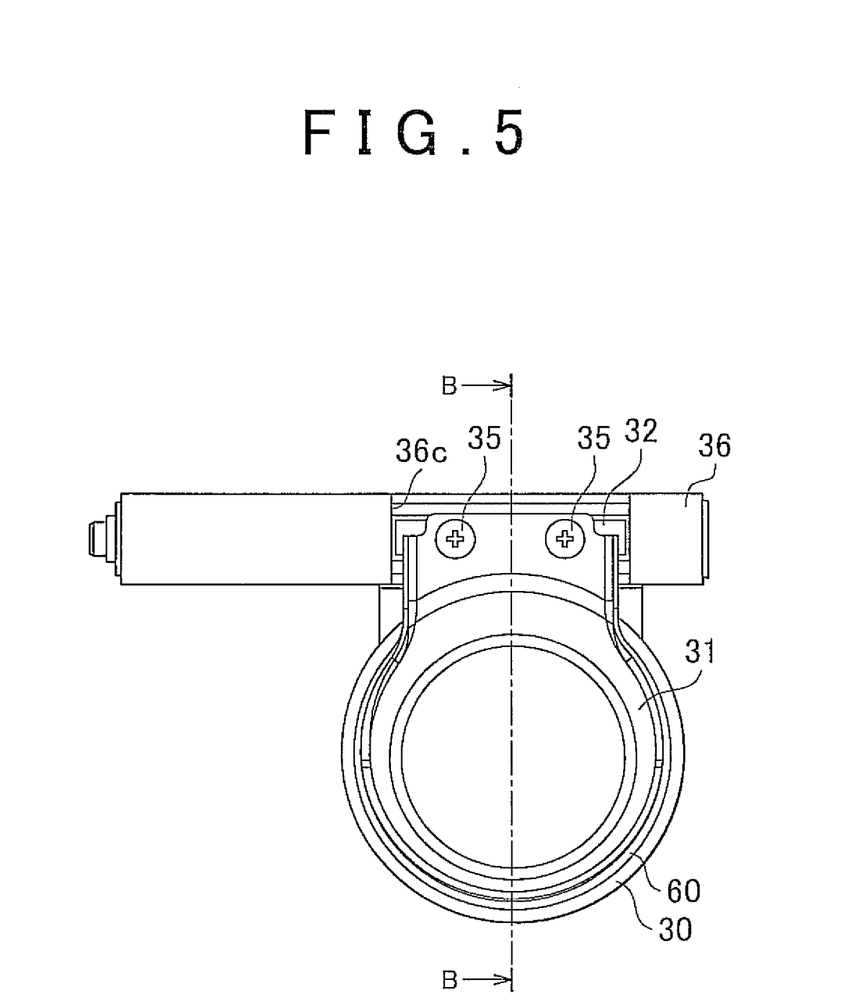
FIG. 5 is a view that shows a valve element that is applied to the exhaust valve structure according to the embodiment of the invention.

The valve element 31 is attached to the pivot shaft 32 by fastening members 35, such as screws. The valve element 31 opens or closes the opening portion 15*b* of the inner cylindrical portion 15 as the pivot shaft 32 rotates in a forward or reverse direction.

Figure 4:
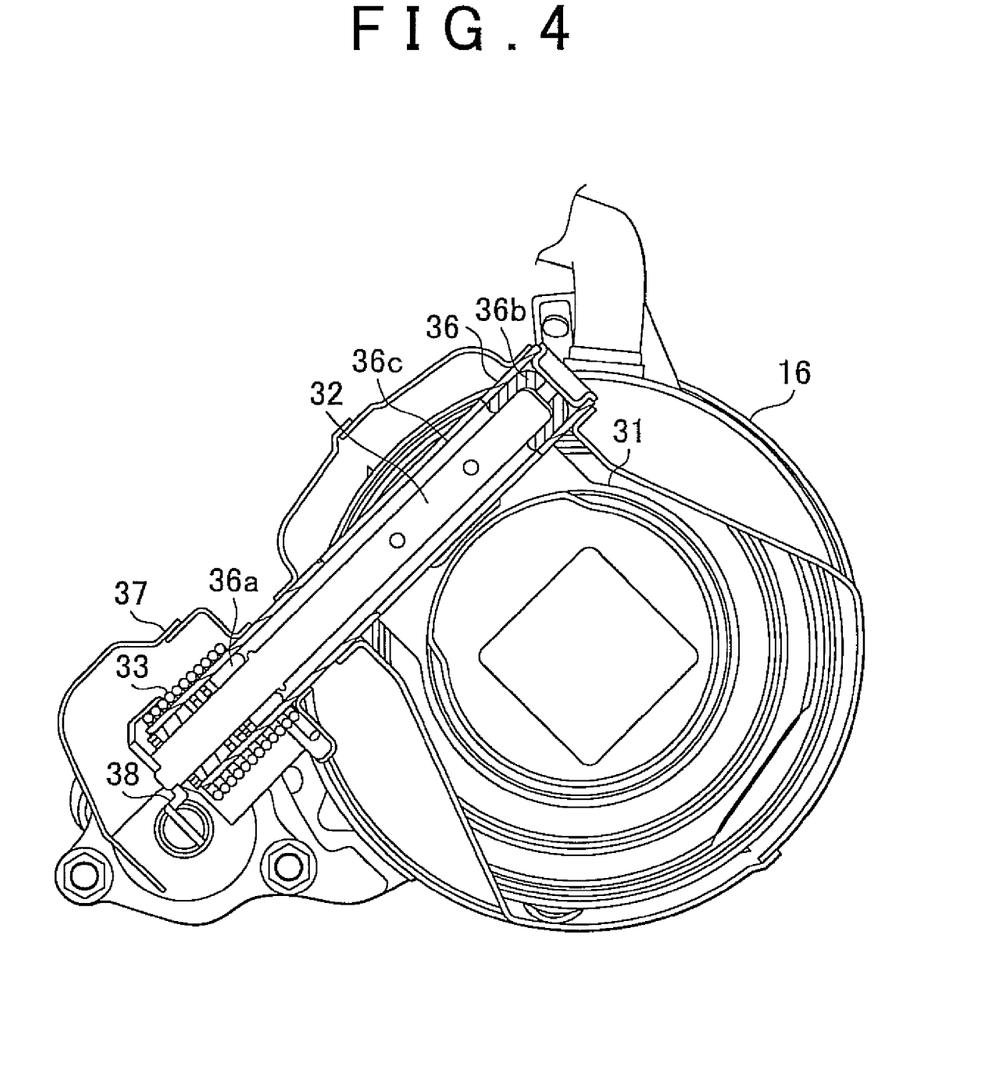
FIG. 4 is a sectional view taken along the line A-A in FIG. 2.

The pivot shaft 32 extends through the outer cylindrical portion 16 so that one end side of the pivot shaft 32 is exposed from the outer cylindrical portion 16 obliquely downward (for example, 45 degrees downward with respect to the horizontal direction) as shown in FIG. 4. Here, the above described obliquely downward direction indicates a direction in a state where the exhaust valve device 20 according to the present embodiment is equipped for the vehicle.

That is, the pivot shaft 32 is accommodated in a shaft case 36 formed of a cylindrical member installed inside the outer cylindrical portion 16, and is rotatably supported by bearings 36*a* and 36*b* fixed to both ends inside the shaft case 36. The shaft case 36 has a window 36*c* in the middle in the axial direction. The window 36*c* ensures the movable region of the valve element 31.

In addition, one end side of the shaft case 36 is exposed from the outer cylindrical portion 16 as in the case of the one end side of the pivot shaft 32. A shield member 37 is coupled to the one end side of the shaft case 36. The shield member 37 accommodates therein components, such as the one end side of the pivot shaft 32 and the helical torsion spring 33. The shield member 37 blocks radiation heat radiated from the outer cylindrical portion 16 to the helical torsion spring 33, and prevents splashes of water, splashes of mud, or the like, from ahead during running of the vehicle from adhering to the pivot shaft 32, the helical torsion spring 33, or the like.

The helical torsion spring 33 is provided at one end side of the pivot shaft 32 exposed from the outer cylindrical portion 16. One end of the helical torsion spring 33 is anchored to the shield member 37, and the other end of the helical torsion spring 33 is anchored to the distal end of the one end side of the pivot shaft 32. Then, the helical torsion spring 33 urges the pivot shaft 32 to rotate in a direction in which the valve element 31 closes the opening portion 15*b*.

Note that a spring provided at the one end side of the pivot shaft 32 is not limited to the helical torsion spring 33; another type of spring may be employed as long as the spring is able to urge the pivot shaft 32 to rotate.

In addition, an actuator connecting portion 38 that moves integrally with the actuator 34 is provided at the one end side of the pivot shaft 32. The actuator connecting portion 38 is formed of a contact member fixed to the pivot shaft 32 so that an extendable rod 34*a* (described later) of the actuator 34 can contact the actuator connecting portion 38 at an off-center position of the pivot shaft 32.

The actuator 34 is fixed to the outer cylindrical portion 16 via a bracket 34*b*, and includes the extendable rod 34*a*. The distal end of the extendable rod 34*a* is inserted in the shield member 37 via an insertion hole formed in the shield member 37.

The actuator 34 extends the extendable rod 34*a* to cause the distal end of the extendable rod 34*a* to press the actuator connecting portion 38 to thereby rotate the pivot shaft 32 in a direction in which the valve element 31 opens the opening portion 15b against the rotational urging force of the helical torsion spring 33.

On the other hand, when the extendable rod 34a of the actuator 34 is contracted, the pivot shaft 32 is rotated in a direction in which the valve element 31 closes the opening portion 15b by the rotational urging force of the helical torsion spring 33.

Next, the flow of exhaust gas that flows through the thus configured exhaust heat recovery device 4 will be described with reference to FIG. 3.

As shown in FIG. 3, exhaust gas emitted from the engine 1 through the operation of the engine 1 (see FIG. 1) passes through the exhaust pipe 2 and catalyst converter 3 provided at the upstream side and is introduced from the exhaust gas introducing port 15a to the introducing passage 7 of the inner cylindrical portion 15.

Here, when the valve element 31 closes the opening portion 15b, that is, when the valve element 31 is closed, exhaust gas introduced into the introducing passage 7 is guided to the heat recovery exhaust gas passage 8a via the communication holes 15c and flows in the direction indicated by the arrow in the drawing.

Exhaust gas flowing through the heat recovery exhaust gas passage 8a exchanges heat with engine coolant flowing through the engine coolant passage 11a, turns around inside the closing member 17 and is then introduced into the heat recovery exhaust gas passage 8b.

Exhaust gas flowing through the heat recovery exhaust gas passage 8b exchanges heat with engine coolant flowing inside the engine coolant passage 11a and the engine coolant passage 11b and then flows from the heat recovery exhaust gas passage 8b toward the downstream side of the outer cylindrical portion 16 in the direction indicated by the arrow in the drawing.

Exhaust gas that has passed through the heat recovery exhaust gas passage 8b is emitted from the exhaust port 16a of the outer cylindrical portion 16 to the downstream side exhaust pipe 2 (see FIG. 1).

Note that engine coolant introduced from the coolant introducing hose 21 (see FIG. 2) into the engine coolant passage 11a or 11b is heated by heat exchange with exhaust gas flowing through the heat recovery exhaust gas passage 8a or 8b, and is then delivered from the coolant drain hose 22 to the outside of the exhaust heat recovery device 4.

On the other hand, when the heat of exhaust gas is not recovered by the exhaust heat recovery device 4 or the amount of heat recovered is suppressed, the valve element 31 is opened. When the valve element 31 opens the opening portion 15b of the inner cylindrical portion 15, that is, when the valve element 31 is open, a major part of exhaust gas that would have been guided from the introducing passage 7 to the heat recovery exhaust gas passage 8a via the communication holes 15c directly passes through the introducing passage 7 from the upstream side toward the downstream side, and is emitted to the outside of the inner cylindrical portion 15 via the opened opening portion 15b, and is then emitted from the exhaust port 16a of the outer cylindrical portion 16 to the downstream side exhaust pipe 2 (see FIG. 1). At this time, the amount of exhaust gas introduced into the heat recovery exhaust gas passages 8a and 8b significantly reduces, so the amount of heat recovered from exhaust gas is suppressed.

Incidentally, in the exhaust valve device 20, when the pressure of exhaust gas exerted on the valve element 31 balances with the rotational urging force of the helical torsion spring 33, the valve element 31 may chatter because of the pulse of exhaust gas, that is, so-called chattering may occur. In general, when chattering occurs, there is a problem that the valve element repeatedly collides with the stay member and an impact sound due to the collision becomes large noise that propagates to the vehicle cabin.

In the present embodiment, in order to prevent such an impact sound due to chattering, the exhaust valve structure described below is applied to the exhaust valve device 20.

The exhaust valve structure applied to the exhaust valve device 20 according to the present embodiment will be described with reference to FIG. 6.

Figure 6:
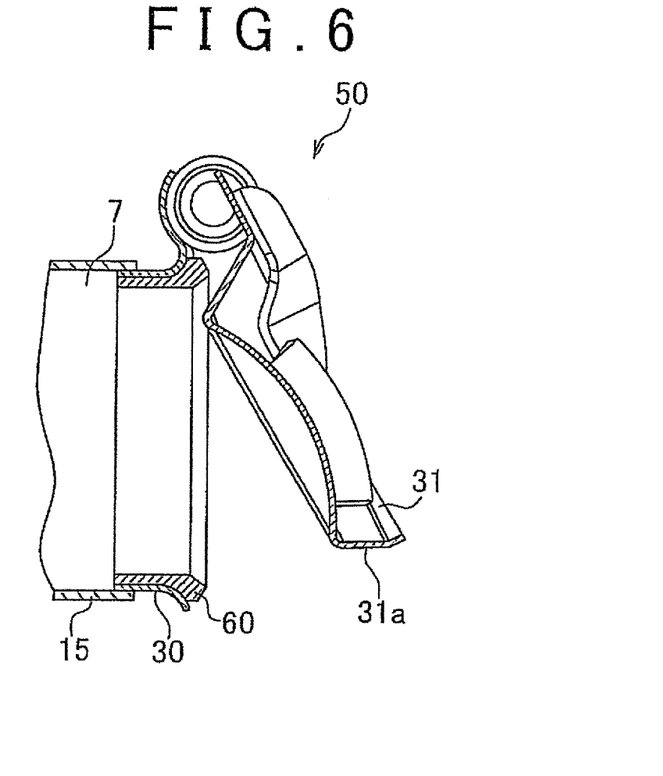
FIG. 6 is a sectional view taken along the line B-B in FIG. 5.

As shown in FIG. 6, the exhaust valve structure 50 includes the above described inner cylindrical portion 15 and valve element 31. Note that the inner cylindrical portion 15 according to the present embodiment may be regarded as a cylindrical member according to the aspect of the invention and the valve element 31 may be regarded as a valve element according to the aspect of the invention.

As described above, the inner cylindrical portion 15 forms the introducing passage 7 as a passage of exhaust gas, and includes the stay member 30. The stay member 30 is fixed at one end, that is, the downstream end, of the inner cylindrical portion 15. Note that the stay member 30 in the present embodiment is an example of a valve seat portion.

The stay member 30 is coupled to the inner peripheral side of the inner cylindrical portion 15, and supports the wire mesh 60. That is, the wire mesh 60 is interposed between the stay member 30 and the valve element 31.

The wire mesh 60 is formed by pressing, for example, stainless wires that are braided into a mesh, and is fanned so that the wires are relatively densely braided. In addition, the wire mesh 60 is formed in an annular shape, and is provided all around the opening portion 15b.

In addition, the valve element 31 contacts the wire mesh 60 when the valve element 31 closes the opening portion 15b, that is, when the introducing passage 7 is closed. Note that the details of the stay member 30 and wire mesh 60 will be described later.

The valve element 31 has an outer peripheral surface portion 31a that contacts the wire mesh 60 when the introducing passage 7 is closed. In addition, when the valve element 31 pivots in the counterclockwise direction in the drawing, the outer peripheral surface portion 31a is separated from the stay member 30 and the wire mesh 60.

Next, the details of the stay member 30 and wire mesh 60 according to the present embodiment will be described with reference to FIG. 7.

Figure 7:
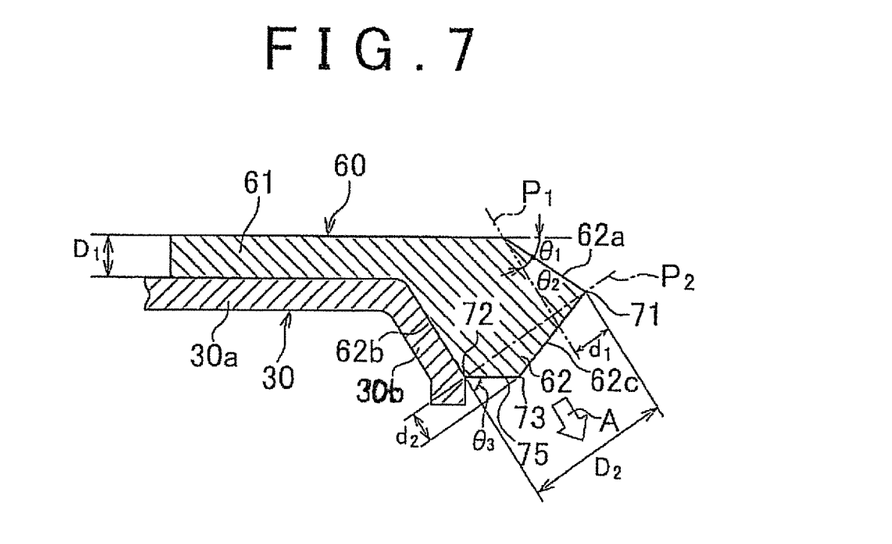
FIG. 7 is a partially enlarged sectional view of the exhaust valve structure according to the embodiment of the invention.

As shown in FIG. 7, the stay member 30 is formed of a cylindrical portion 30a and a bent portion 30b. The wire mesh 60 is fixed to the cylindrical portion 30a. The bent portion 30b is integrally formed with the cylindrical portion 30a, and is bent radially outward with respect to the cylindrical portion 30a. The bent portion 30b retains the wire mesh 60. Note that the cylindrical portion 30a in the present embodiment is an example of a mesh support portion.

The wire mesh 60 is formed of a cylindrical fixing portion 61 and a contact portion 62. The fixing portion 61 is fixed to the cylindrical portion 30a of the stay member 30. The contact portion 62 is integrally formed with the fixing portion 61. When the introducing passage 7 is closed, the contact portion 62 contacts the outer peripheral surface portion 31a of the valve element 31 to receive a load from the valve element 31.

The contact portion 62 is formed so that the diameter gradually increases from the fixing portion 61 toward the downstream side (right side in FIG. 7) of the introducing passage 7 and a load on the stay member 30 when the valve element 31 contacts the contact portion 62 is distributed in the diameter-increasing direction (indicated by the arrow A in FIG. 7).

That is, the contact portion 62 is thicker than the fixing portion 61, and the thickness $D_2$ of the contact portion 62 in the radial direction is larger than the thickness $D_1$ of the fixing portion 61 in the radial direction ($D_2 > D_1$).

Specifically, the contact portion 62 includes an inner peripheral surface portion 62a, a retained surface portion 62b and a deformable surface portion 62c. The inner peripheral surface portion 62a contacts the outer peripheral surface portion 31a of the valve element 31 when the introducing passage 7 is closed. The retained surface portion 62b is retained by the bent portion 30b. The deformable surface portion 62c is formed at an end of the wire mesh 60 in the diameter-increasing direction. The deformable surface portion 62c elastically deforms owing to a load received from the valve element 31.

The inner peripheral surface portion 62a is inclined radially outward at a predetermined angle $\theta_1$ with respect to the inner peripheral surface of the fixing portion 61. Thus, the inner peripheral surface portion 62a gradually increases in diameter from the downstream end of the inner peripheral surface of the fixing portion 61 toward the downstream side (right side in FIG. 7) of the introducing passage 7.

Furthermore, the inner peripheral surface portion 62a is inclined radially inward with respect to the bent portion 30b of the stay member 30. That is, the inner peripheral surface portion 62a is inclined radially inward at a predetermined angle $\theta_2$ with respect to a plane $P_1$ parallel to the bent portion 30b and the retained surface portion 62b. Note that the inner peripheral surface portion 62a may be parallel to the bent portion 30b.

In addition, when the length of the inner peripheral surface portion 62a in the diameter-increasing direction is constant, the inclination angles $\theta_1$ and $\theta_2$ each may be set to a selected inclination angle by appropriately changing a distance $d_1$ between the plane $P_1$ and a peripheral edge 71 of the inner peripheral surface portion 62a in the diameter-increasing direction.

The deformable surface portion 62c has a top edge portion 73 that is spaced apart in the diameter-increasing direction from a plane $P_2$ that includes the peripheral edge 71 and an outer edge 72 of the retained surface portion 62b in the diameter-increasing direction. The top edge portion 73 is spaced apart at a distance $d_2$ from the plane $P_2$ in the diameter-increasing direction.

Here, the above described distances $d_1$ and $d_2$ are set to optimal values empirically obtained in advance so as to achieve the shape of the contact portion 62 such that an impact on the stay member 30 due to a load received from the valve element 31 may be absorbed as much as possible.

Furthermore, the deformable surface portion 62c has a cutout surface portion 75 that is cut at a predetermined angle $\theta_3$ with respect to the retained surface portion 62b. The cutout surface portion 75 is formed between the top edge portion 73 and the outer edge 72. Therefore, the deformable surface portion 62c elastically deforms to cause the cutout surface portion 75 to collapse on the side of the stay member 30 because of a load received from the valve element 31 when the valve element 31 contacts the inner peripheral surface portion 62a.

Note that the above described predetermined angle $\theta_3$ is set so that the cutout surface portion 75 is allowed to collapse on the side of the stay member 30.

Next, the operation of the wire mesh 60 according to the present embodiment will be described with reference to FIG. 8A and FIG. 8B.

Figure 8A:
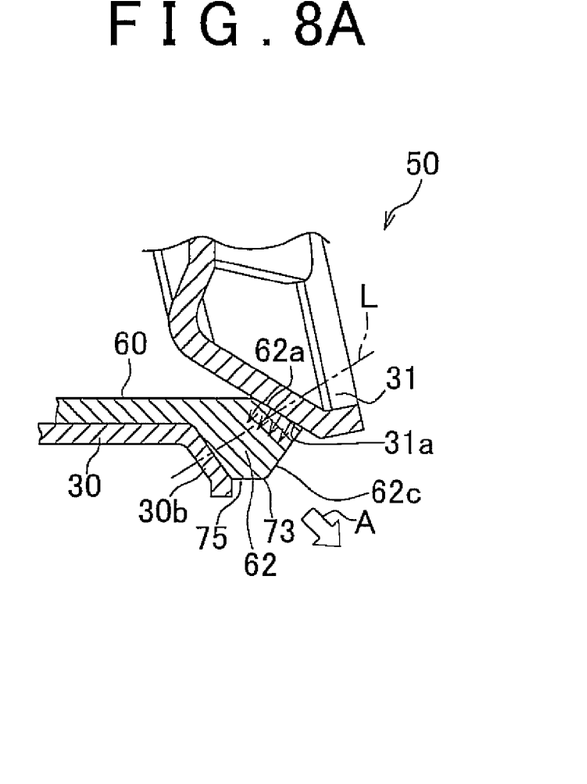
FIG. 8A is a schematic view for illustrating the operation of the exhaust valve structure according to the embodiment of the invention, and is a view that shows a state before a wire mesh is elastically deformed.

FIG. 8A is a schematic view that shows a state before the wire mesh 60 is elastically deformed when the valve element 31 contacts the wire mesh 60. FIG. 8B is a schematic view that shows a state where the wire mesh 60 is elastically deformed when the valve element 31 contacts the wire mesh 60.

As shown in FIG. 8A, when the outer peripheral surface portion 31a of the valve element 31 contacts the inner peripheral surface portion 62a of the wire mesh 60, because the inner peripheral surface portion 62a is inclined radially inward at the predetermined angle $\theta_2$ with respect to the plane $P_1$ (see FIG. 7), a load on the stay member 30 via the wire mesh 60 is distributed in the diameter-increasing direction (indicated by the arrow A in the drawing) with respect to a normal L to the bent portion 30b as indicated by the arrow in the drawing.

That is, when the valve element 31 contacts the wire mesh 60, a load on the wire mesh 60 received from the valve element 31 is exerted toward the top edge portion 73 or cutout surface portion 75 of the deformable surface portion 62c.

Figure 8B:
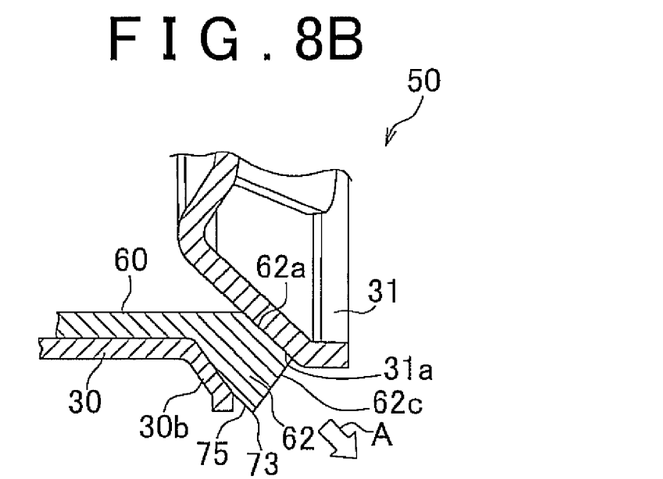
FIG. 8B is a schematic view for illustrating the operation of the exhaust valve structure according to the embodiment of the invention, and is a view that shows a state where the wire mesh is elastically deformed.

Subsequently, as shown in FIG. 8B, the contact portion 62 of the wire mesh 60 elastically deforms because of a load received from the valve element 31 so that the deformable surface portion 62c extends in the diameter-increasing direction and the cutout surface portion 75 collapses on the side of the stay member 30.

The elastic deformation of the wire mesh 60 absorbs an impact when the valve element 31 is closed during chattering. Therefore, a load exerted from the valve element 31 on the stay member 30 during chattering is reduced. This suppresses generation of an impact sound due to an impact during chattering.

Next, an impact sound during chattering will be described by comparing the exhaust valve structure 50 to which the wire mesh 60 according to the present embodiment is applied and an exhaust valve structure to which a wire mesh having an existing shape (existing wire mesh) is applied with reference to FIG. 9.

Figure 9:
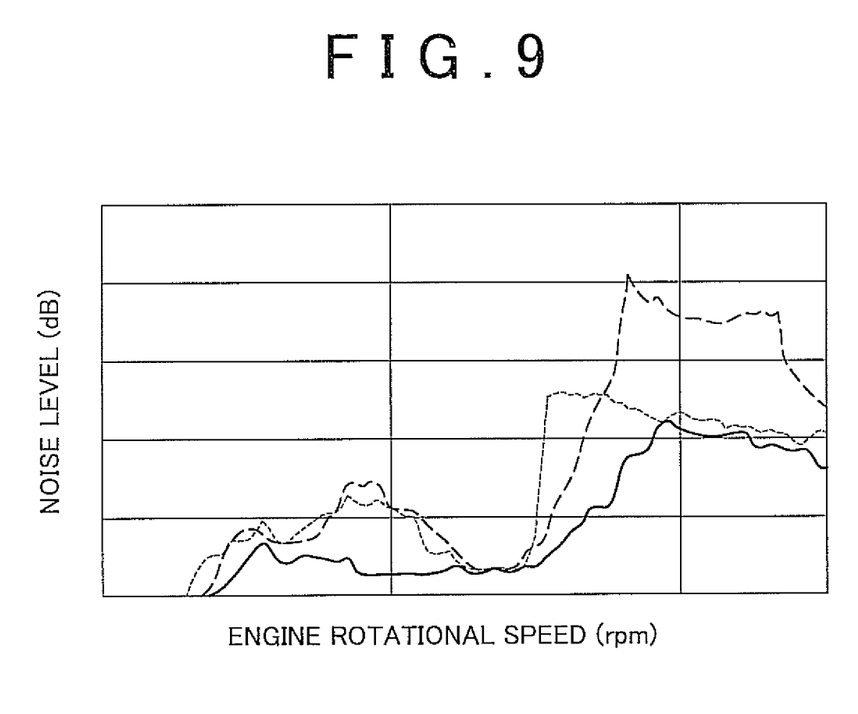
FIG. 9 is a graph that compares a noise level during chattering between the exhaust valve structure according to the embodiment and an existing exhaust valve structure.
Figure 10:
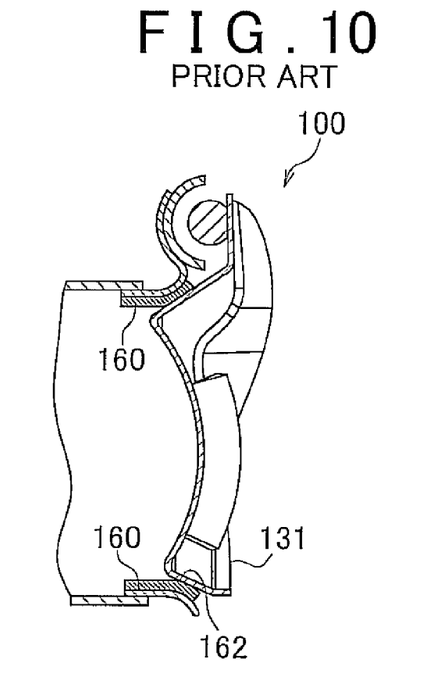
FIG. 10 is a sectional view that shows an exhaust valve structure to which a wire mesh having an existing shape is applied.

Note that, as shown in FIG. 10, the existing wire mesh to be compared in FIG. 9 is formed so that the thickness in the radial direction is uniform and a contact portion 162 that contacts a valve element 131 has a plate-like shape.

In FIG. 9, the abscissa axis represents engine rotational speed (rpm), and the ordinate axis represents noise level (dB). In addition, in the drawing, the wide broken line indicates an exhaust valve structure to which the existing wire mesh is applied and in which no weight is provided for the valve element (hereinafter, simply referred to as existing exhaust valve structure (without weight)). In the drawing, the narrow broken line indicates an exhaust valve structure to which the existing wire mesh is applied and in which a weight is provided for the valve element (hereinafter, simply referred to as existing exhaust valve structure (with weight)). On the other hand, in the drawing, the wide solid line indicates the exhaust valve structure 50 according to the present embodiment.

As shown in FIG. 9, the existing exhaust valve structure (without weight) has the highest noise level (dB) during chattering, the existing exhaust valve structure (with weight) has the second highest noise level (dB) and the exhaust valve structure 50 has the lowest noise level (dB).

Here, the existing exhaust valve structure (with weight) is lower in noise level (dB) than the existing exhaust valve structure (without weight). This is because chattering itself is suppressed with a weight provided for the valve element.

In this way, the exhaust valve structure 50 according to the present embodiment is lower in noise level (dB) during chattering than the existing exhaust valve structure (with weight) that is provided with a weight to take measures against chattering.

Thus, in the exhaust valve structure 50 according to the present embodiment, it is not necessary to provide a weight for the purpose of preventing chattering, and it is possible to reduce noise level (dB) during chattering only by changing the shape of the wire mesh 60. Therefore, it is possible to achieve reduction in the cost and weight of the exhaust valve structure 50.

In addition, in an existing art, there is another exhaust valve structure in which, in addition to the above described exhaust valve structure 100 shown in FIG. 10, two wire meshes are stacked only at the upper portion, that is, the pivot axis side of the valve element 131, in FIG. 10. However, in such an exhaust valve structure in which two wire meshes are stacked, when the valve element is closed, a gap is formed between the lower portion of the wire mesh and the valve element. Therefore, when the exhaust valve structure in which two existing wire meshes are stacked are, for example, applied to the exhaust heat recovery device, it is difficult to effectively utilize exhaust heat, and there is a possibility that it is difficult to sufficiently exercise performance, such as heating and facilitating the warm-up of the engine.

Figure 11:
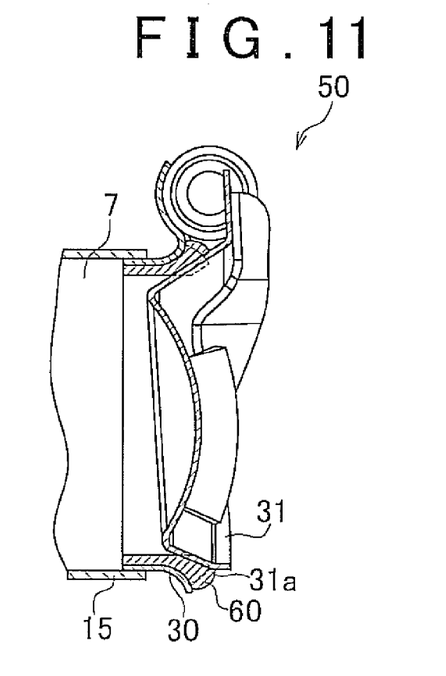
FIG. 11 is a sectional view that shows a state where a valve element is closed in the exhaust valve structure according to the embodiment of the invention.

In contrast to this, in the exhaust valve structure 50 according to the present embodiment, as shown in FIG. 11, because the wire mesh 60 is provided all around the stay member 30, no gap is formed between the wire mesh 60 and the valve element 31 even when the valve element 31 is closed. Therefore, in the exhaust valve structure 50 according to the present embodiment, for example, it is possible to reliably ensure the amount of exhaust heat recovered at the time of a cold start immediately after engine start, and it is possible to sufficiently exercise performance, such as heating and facilitating the warm-up of the engine 1.

As described above, in the exhaust valve structure 50 according to the present embodiment, the wire mesh 60 is formed in a shape such that the diameter gradually increases toward the downstream side of the introducing passage 7 and a load exerted on the stay member 30 when the valve element 31 contacts the wire mesh 60 is distributed in the diameter-increasing direction, so a load exerted on the stay member 30 when the valve element 31 contacts the wire mesh 60 may be reduced as compared with the existing art. Therefore, it is possible to prevent generation of an impact sound due to an impact during chattering.

In addition, in the exhaust valve structure 50 according to the present embodiment, the inner peripheral surface portion 62a of the wire mesh 60 is inclined radially inward with respect to the bent portion 30b of the stay member 30, so a load received from the valve element 31 when the inner peripheral surface portion 62a contacts the outer peripheral surface portion 31a of the valve element 31 may be exerted on the deformable surface portion 62c. Therefore, when the outer peripheral surface portion 31a of the valve element 31 contacts the inner peripheral surface portion 62a of the contact portion 62, the deformable surface portion 62c may be elastically deformed by a load received from the valve element 31.

Thus, it is possible to absorb an impact during chattering owing to the elastic deformation of the deformable surface portion 62c. As a result, as described above, it is possible to prevent generation of an impact sound due to an impact during chattering.

In addition, in the exhaust valve structure 50 according to the present embodiment, the deformable surface portion 62c of the wire mesh 60 has the top edge portion 73 that is spaced apart in the diameter-increasing direction (direction indicated by the arrow A in FIG. 7) from the plane $P_2$ that includes the peripheral edge 71 of the inner peripheral surface portion 62a in the diameter-increasing direction and the outer edge 72 of the retained surface portion 62b in the diameter-increasing direction, so, when the outer peripheral surface portion 31a contacts the inner peripheral surface portion 62a, the deformable surface portion 62c may be easily elastically deformed in the diameter-increasing direction by a load received from the valve element 31.

In addition, in the exhaust valve structure 50 according to the present embodiment, the deformable surface portion 62c of the wire mesh 60 has the cutout surface portion 75 that is cut at the predetermined angle $\theta_3$ with respect to the retained surface portion 62b. In addition, the deformable surface portion 62c deforms so that the cutout surface portion 75 collapses on the side of the stay member 30 by a load received from the valve element 31 when the valve element 31 contacts the inner peripheral surface portion 62a. Therefore, the cutout surface portion 75 collapses to make it possible to absorb an impact during chattering, and it is possible to prevent generation of an impact sound.

In addition, in the exhaust valve structure 50 according to the present embodiment, the contact portion 62 of the wire mesh 60 is thicker than the fixing portion 61 of the wire mesh 60, so it is possible to improve the impact absorption performance of the contact portion 62.

In addition, only the contact portion 62 of the wire mesh 60 is made thick, the thickness of the fixing portion 61 may be formed as large as the thickness of the fixing portion in the existing art, so there is no influence even when the wire mesh 60 is fixed to the stay member 30 by, for example, spot welding. Therefore, it is possible to ensure production technique and assembling work as in the existing art.

Figure 12:
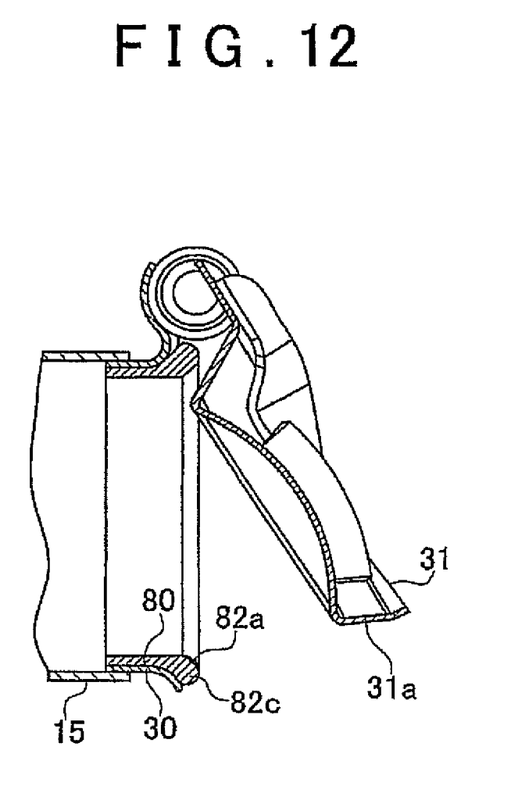
FIG. 12 is a sectional view that shows an alternative embodiment to the embodiment of the invention.

Note that, in the exhaust valve structure 50 according to the present embodiment, the shape of the deformable surface portion 62c of the wire mesh 60 is a polyhedral shape including the cutout surface portion 75; however, the shape of the deformable surface portion 62c of the wire mesh 60 is not limited to this shape. Then, an alternative embodiment to the present embodiment will be described below. Like a wire mesh 80 shown in FIG. 12, the radially sectional shape of a deformable surface portion 82c may be a circular arc shape. Furthermore, the radially sectional shape of an inner peripheral surface portion 82a may be a circular arc shape, or it is also applicable that both surface portions of the inner peripheral surface portion 82a and deformable surface portion 82c are continuously connected and the radially sectional shape of each of the surface portions is a circular arc shape.

In addition, in the present embodiment, the exhaust valve structure 50 is applied to the exhaust valve device 20 of the exhaust heat recovery device 4; however, the aspect of the invention is not limited to this configuration. The exhaust valve structure 50 may be applied to another component of the vehicle exhaust system structure 10, such as a variable valve device of the main muffler 5.

Furthermore, in the present embodiment, the open-close of the valve element 31 is controllable by the actuator 34; however, the aspect of the invention is not limited to this configuration. The valve element 31 may be a self-pressure control valve that opens or closes by the pressure of exhaust gas.

As described above, the exhaust valve structure according to the aspect of the invention is able to prevent an impact sound due to an impact during chattering, and is useful as an exhaust valve structure provided in an exhaust passage of an internal combustion engine equipped for a vehicle.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An exhaust valve structure comprising:
    a cylindrical member that is configured to form a passage of exhaust gas and to have a valve seat portion;
    a valve element that is configured to close or open the passage; and
    a wire mesh that is configured to be fixed to the valve seat portion and to contact the valve element when the passage is closed and in which the valve element is spaced apart from the wire mesh when the passage is open,
    wherein the wire mesh is formed in a shape such that a diameter of the wire mesh gradually increases toward a downstream side of the passage and a load exerted on the valve seat portion when the valve element contacts the wire mesh is distributed in a diameter-increasing direction in which the diameter of the wire mesh increases,
    wherein the valve element has an outer peripheral surface portion that contacts the wire mesh when the passage is closed, the wire mesh is formed of a cylindrical fixing portion that is fixed to the valve seat portion and a contact portion that is integrally formed with the fixing portion and that contacts the valve element to receive a load from the valve element when the passage is closed, the valve seat portion has a cylindrical mesh support portion to which the fixing portion is fixed and a bent portion that is bent radially outward with respect to the mesh support portion and that retains the contact portion, the contact portion has an inner peripheral surface portion that contacts the outer peripheral surface portion when the passage is closed and a deformable surface portion that is formed at an end in the diameter-increasing direction, and the inner peripheral surface portion is inclined radially inward with respect to the bent portion.

2. The exhaust valve structure according to claim 1, wherein
    the contact portion has a retained surface portion that is retained by the bent portion, and the deformable surface portion has a top edge portion that is spaced apart in the diameter-increasing direction from a plane that includes a peripheral edge of the inner peripheral surface portion in the diameter-increasing direction and an outer edge of the retained surface portion in the diameter-increasing direction.

3. The exhaust valve structure according to claim 2, wherein
    the deformable surface portion has a cutout surface portion that is cut at a predetermined angle with respect to the retained surface portion, and the deformable surface portion deforms so that the cutout surface portion collapses on a side of the valve seat portion by a load received from the valve element when the valve element contacts the inner peripheral surface portion.

4. The exhaust valve structure according to claim 2, wherein
    a radially sectional shape of the deformable surface portion is a circular arc shape.

5. The exhaust valve structure according to claim 2, wherein
    a radially sectional shape of the inner peripheral surface portion is a circular arc shape.

6. The exhaust valve structure according to claim 2, wherein
    the contact portion is thicker than the fixing portion.

7. The exhaust valve structure according to claim 1, wherein
    the contact portion is thicker than the fixing portion.

8. An exhaust valve structure comprising:
    a cylindrical member that is configured to form a passage of exhaust gas and to have a valve seat portion;
    a valve element that is configured to close or open the passage; and
    a wire mesh that is configured to be fixed to the valve seat portion and to contact the valve element when the passage is closed, wherein
    the valve element has an outer peripheral surface portion that contacts the wire mesh when the passage is closed,
    the wire mesh is formed in a shape such that a diameter of the wire mesh gradually increases toward a downstream side of the passage,
    the wire mesh is formed of a cylindrical fixing portion that is fixed to the valve seat portion and a contact portion that is integrally formed with the fixing portion and that contacts the valve element to receive a load from the valve element when the passage is closed,
    the valve seat portion has a cylindrical mesh support portion to which the fixing portion is fixed and a bent portion that is bent radially outward with respect to the mesh support portion, the bent portion contacts and retains the contact portion,
    the contact portion has an inner peripheral surface portion that contacts the outer peripheral surface portion when the passage is closed and a deformable surface portion that is formed at an end in a diameter-increasing direction in which the diameter of the wire mesh increases, and
    the inner peripheral surface portion is inclined radially inward with respect to the bent portion.

9. The exhaust valve structure according to claim 8, wherein
    the contact portion has a retained surface portion that is retained by the bent portion, and the deformable surface portion has a top edge portion that is spaced apart in the diameter-increasing direction from a plane that includes a peripheral edge of the inner peripheral surface portion in the diameter-increasing direction and an outer edge of the retained surface portion in the diameter-increasing direction.

10. The exhaust valve structure according to claim 9, wherein
    the deformable surface portion has a cutout surface portion that is cut at a predetermined angle with respect to the retained surface portion, and the deformable surface portion deforms so that the cutout surface portion collapses on a side of the valve seat portion by a load received from the valve element when the valve element contacts the inner peripheral surface portion.

11. The exhaust valve structure according to claim 9, wherein
   a radially sectional shape of the deformable surface portion is a circular arc shape.

12. The exhaust valve structure according to claim 9, wherein
   a radially sectional shape of the inner peripheral surface portion is a circular arc shape.

13. The exhaust valve structure according to claim 9, wherein
   the contact portion is thicker than the fixing portion.

14. The exhaust valve structure according to claim 8, wherein
   the contact portion is thicker than the fixing portion.

* * * * *